United States Patent [19]

Clarke

[11] Patent Number: 4,530,310
[45] Date of Patent: Jul. 23, 1985

[54] DOG LEASH ASSEMBLY

[76] Inventor: Bruce Clarke, P.O. Box 8857, Fort Lauderdale, Fla. 33310

[21] Appl. No.: 567,420

[22] Filed: Dec. 30, 1983

[51] Int. Cl.³ .................. A01K 27/00; F41B 15/02
[52] U.S. Cl. .................................. 119/109; 273/84 R
[58] Field of Search ............... 119/109, 110, 114, 115; 273/84 R, 84 A

[56] References Cited

U.S. PATENT DOCUMENTS

| | | | |
|---|---|---|---|
| 2,275,701 | 3/1942 | Taylor | 119/109 |
| 2,322,897 | 6/1943 | Bogaerde, Jr. | 119/109 |
| 2,337,970 | 12/1943 | Cassell | 119/109 |
| 2,929,358 | 3/1960 | Morrow | 119/109 |
| 3,244,149 | 4/1966 | Bosko et al. | 119/109 X |
| 4,007,931 | 2/1977 | Wich et al. | 273/84 A |
| 4,132,408 | 1/1979 | Sabat | 273/84 A |

Primary Examiner—Robert P. Swiatek
Attorney, Agent, or Firm—Eugene F. Malin

[57] ABSTRACT

A dog leash lead which may be converted into a weapon commonly known as nanchuka sticks. A flexible interconnecting connector attached to a handle member protrudes through a hollow second member to retain an animal. The handle member and second member attach to form an elongated lead and detach to form two members connected by the flexible connector through the second member to comprise the nanchuka stick. A spring operated locking mechanism rigidly locks the handle and second member together. An alternative dog leash consisting of a rigid member, a flexible leash and a gripping handle. A rigid lead is secured to the hand of a dog handler by a strap and secure gripping is provided by a contoured grip on the proximal end of the lead. The proximal end of the lead is held in the hand of the handler. A portion of the proximal end of the flexible leash is attached to the distal end of the lead. At the distal end of the leash is attached a swivel snap hook for attachment to the dog collar.

5 Claims, 4 Drawing Figures

U.S. Patent  Jul. 23, 1985  4,530,310
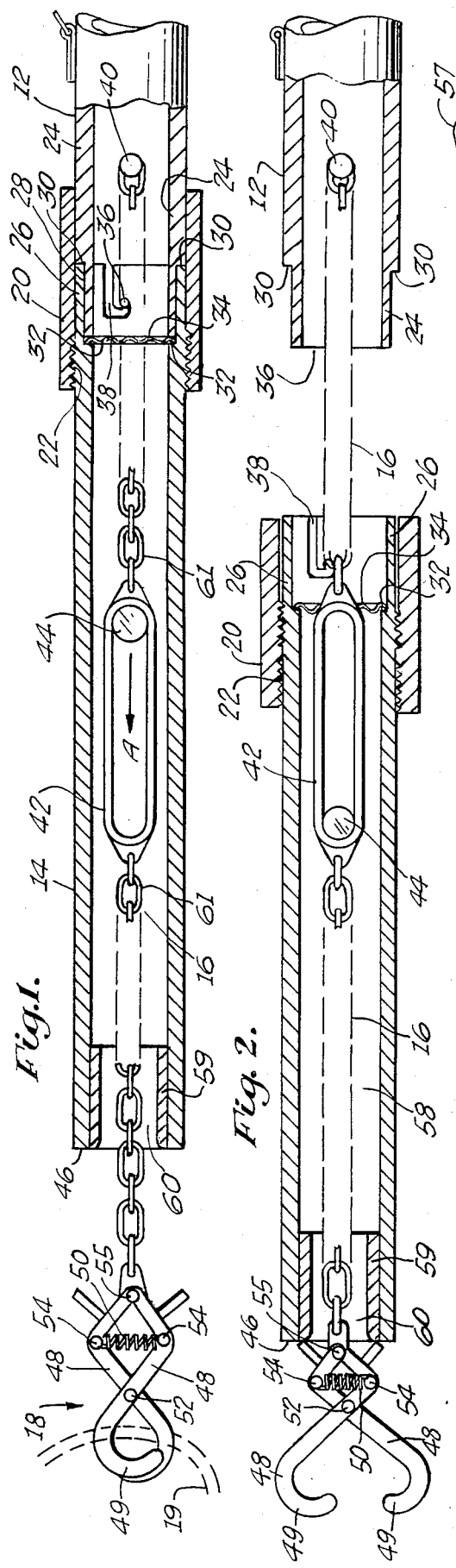
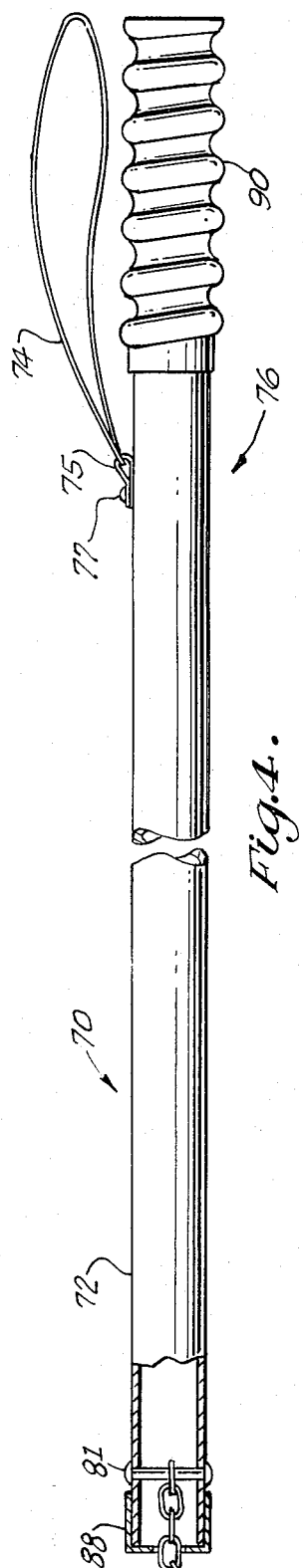

DOG LEASH ASSEMBLY

BACKGROUND OF THE INVENTION

This invention relates to dog leashes or leads having an elongated member which is stiff or rigid to provide greater control of the dog during training and while walking. The rigid portion provides the handler with a certain amount of leverage. The elongated member allows the handler to keep the dog away from his body and legs. Although the dog may provide a certain amount of protection it would be preferrable if the animal handler had a weapon. This would be advantageous for guards or even people out walking their dogs.

SUMMARY OF THE INVENTION

The primary embodiment of the invention comprises two metal shafts which are connectable to form a lead for an animal such as a dog. A chain or other connecting means extends through both shafts and extends a short distance from the end of the lead to connect with a hook means for retaining the collar of an animal. When desired the two shafts may be disconnected and the lower shaft slides down the connecting means to impinge on the hook means thereby opening the hook means and releasing the hold on the animal. The hook means prevents the lower shaft from sliding further. The two shafts are connected together by a length of the chain form a weapon commonly referred to as nanchuka sticks. The upper shaft is grasped as the handle and the lower shaft is swung by the upper shaft as a club. The whipping action of this combination makes this a deadly weapon.

The secondary embodiment of the invention comprises a generally rigid elongated member (the lead), a flexible leash means connected to the distal end of the lead, a snap hook assembly for connection with a dog collar, a hand retaining strap attached to the proximal end of the lead and a grip attached to the proximal end of the lead. The user of the leash is provided with a contoured grip on the proximal end of the elongated rigid member. The rigid member will generally be hollow. A looped retaining strap is connected to the proximal end of the rigid member adjacent the contoured grip. At the distal end of the rigid member is attached a section of chain or other such flexible leash means. At the distal end of the leash means is a connecting link and snap hook. The snap hook is connectable to a dog's collar. The lead assembly may also be used as a prod or club for protection.

An objective of this invention is to provide a rigid lead for an animal which is rapidly convertible into a weapon.

Another objective is to provide a lead which is convertible into a set of nunchaku sticks.

Still another objective is to provide a lead with a leash having a quick disconnect apparatus for releasing the animal.

Yet another objective is to provide a lead with a leash having a quick disconnect apparatus which releases the animal simultaneously with conversion of the lead into a weapon.

Another objective is to provide a lead having rigid member for providing leverage in controlling an animal.

In accordance with these and other objects that shall become apparent hereinafter, the instant invention will be more fully understood from the following detailed description, it being understood, however, that the invention is capable of extended application and is not confined to the precise disclosure. Changes and modifications may be made that do not affect the spirit of the invention, nor exceed the scope thereof, as expressed in the appended claims.

Accordingly, the instant invention will now be described with reference to an exemplary preferred embodiment acompanied by the drawing figures, wherein:

BRIEF DESCRIPTION OF THE DRAWING

FIG. 1 is a side, elevational, cut away view of the invention.

FIG. 2 is a side, elevational, cut away view of the invention in the extended position.

FIG. 3 is a perspective view of the dog lead assembly in the weapon configuration.

FIG. 4 is a partial cut away, side elevational view of the alternate embodiment of the invention.

DESCRIPTION OF THE PREFERRED EMBODIMENT

Referring now to the drawing Figures the dog leash assembly is shown generally as numeral 10. Assembly 10 has an upper rigid member 12, lower rigid member 14, an interconnecting means 16 (such as a chain apparatus) and a retaining means 18 (such as an overcenter hooking apparatus). Preferably the upper and lower rigid members are constructed of rigid hollow conduit pipe, such as ½ inch in diameter. Collar 20 is constructed of a section of similar conduit with a larger diameter so that it attaches to the outer surface of member 14 by screw-on cooperation between collar 20 and member 14 at 22. The wall portions 24 and 26 of members 12 and 14, respectively, are grooved on their inner and outer surfaces to provide overlapping coupling along surface interface 28 between end portion 24 and 26 and abutting contact at 30 and 32. At 32 there is a circular groove to accommodate a resilient means 34 such as a circular wave spring to provide resilient coaxial pressure on the end of wall portion 24. The upper member 12 and lower member 14 are locked together and retained coaxially against the resilient means 34 by a pressure operated, commonly known J-shaped tab and groove arrangement. To engage members 12 and 14 together, member 12 is inserted into sliding cooperation with member 14. A tab 36 on either wall 24 or 26 is inserted and moved axially along a cooperating groove 38 in the other member until the end of wall 24 impinges against the means 34. At the position where the end of wall 24 is forceably impinged against means 34 the accommodating groove 38 makes a 90° turn parallel to the means 34 (the foot of the J). While maintaining impinging pressure on the means 34 member 12 is rotated so that tab 36 may follow the 90° turn of the groove 38. After a short distance the groove 38 again turns 90° away from the means 34 for a short distance to form a detent to accommodate the tab 36. The resilient pressure of means 34 compels the tab 36 to remain in the detent and thereby members 12 and 14 are attached. Collar 20 provides additional lateral support. To detach member 12 and 14 it is only necessary to press members 12 and 14 together further compressing the means 34 and then rotating the tab 36 along groove 38 in reverse order to withdraw tab 36 from groove 38 and separate members 12 and 14.

An interconnecting means 16 connects member 12 and 14. Means 16 is attached to member 12 at 40 by a rivet or other such device. The purpose of means 16 is to provide a leash extending out of member 14 when the lead configuration (member 12 and 14 attached). In the weapon configuration the member 14 is detached from member 12 and means 16 slides through member 14 until retaining means 18 hits the open end of member 14, as illustrated in FIG. 2. The impinging contact causes means 18 to open and release the collar 19 of the animal. Means 18 also prevents chain 16 from slipping out of tube 14. In this manner the weapon shown at FIG. 3 is provided with handle 12, member 14 connected by flexible means 16 to form the nunchaku sticks weapon.

Upon disengagement of the tab-groove lock apparatus member 14 is slid along means 16 within the confines of elongated link 42. Means 16 and link 42 remain stationary because of attachment to member 12 at 40 and rivet 44 (rigidly attached to member 14) slides the length of link 42 in direction A to impinge at the opposing end of link 42, as shown in FIG. 2, simultaneous with the leading edge 46 of member 14 impinging on and opening means 18 as shown in FIG. 2. By reversing this procedure the weapon is returned to the leash configuration attached as one piece by the tab-groove lock.

Means 18 may be any locking apparatus designed to disengage upon pressure being exerted on it by contact with the leading edge 46. Such a device could be a pair of hinged, over-center hooking armatures 48, each having hook portion 49. The over-center relationship shown in FIG. 1 helps to retain the hooks in a closed position when encircled about the collar of an animal. Resilient means 50 provides pressure to maintain the hooks in the over-center relationship to each other. Armatures 48 are hinged at 52, 54, and 55 in order to rotate open as shown in FIG. 2. The resilient pressure of means 50 is overcome by the impinging pressure of contact with edge 46 causing the armatures to rotate as the pressure is translated through pivot points 54.

In FIG. 2 passageway 58 houses the means 16 and link 42. Metal inserts 59 at the mouth 60 of passageway 58 reduce wear on the edges of mouth 60 by the means 16 which may be chain 61 as shown in FIG. 1.

In FIG. 3 the handle 56 of member 12 may be knurled for improved gripping and a wrist strap 57 added to secure the grip. FIG. 3 demonstrates the weapon configuration.

Referring now to FIG. 4 an alternative dog leash assembly is shown generally as numeral 70. Rigid member 72 is an elongated, preferably hollow, rod. A preferred construction is 24 inch conduit, ½ inch inner diameter. A looped wrist strap 74 is attached by a D-ring 75 to the proximal end 76 of member 72. The strap 74 should be provided with a swivel connection 77 to the member 72. A contoured hand grip 90 is also attached to the proximal end 76 to facilitate the gripping of the member 72. Grip 90 can be formed to friction fit snugly over 76, much as a bicycle handle grip friction fits over a bicycle's handle bar. A chain 80, such as twisted steel links of welded construction, or other sufficient flexible leash means is attached to the distal end of member 72 by rivet 81. The preferred working load of the chain is approximately 300 pounds. Also the chain should be shorter in length than member 72 to give the handler stand off distance from the dog. This also increases the handler's leverage. A preferred length would be 12 inches. Several different types of connecting links 84 could be used to connect the chain 80 to a snap link 86. The snap link 86 should have a swivel device to prevent twisting of the chain. A trigger snap hook as shown in FIG. 4 is preferred due to its rapid and simple operation. An end cap 88 may be placed over the distal end 82 with the chain 80 therethrough.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A lead for an animal convertible into a nanchuka stick type weapon, comprising:

a handle member means for anchoring a means for interconnecting with a hollow second member means, said handle member means rigidly connectable to said second member means, said second member means having a passageway therethrough to accommodate said interconnecting means, said second member means slideable along said interconnecting means to contact a retaining means, said second member means connected to said interconnecting means, said interconnecting means connected to said handle member means for suspending said second member means from said handle member means, and said retaining means connected to said interconnecting means for releasably retaining an animal, said retaining means releasable upon contact by said second member means.

2. A lead as in claim 1, further including:

a releasable locking means connecting said handle means and said second member means, said locking means including a tab-in-groove meshing mechanism and a resilient means connected to said locking means between said handle member means and said second member means for resiliently maintaining impinging contact within said tab-in-groove meshing mechanism.

3. A lead as in claim 2, further including:

a collar means connected to said handle member means and said second member means for providing rigidity to an overlapping connection between said handle member means and said second member means.

4. A lead as in claim 1, wherein:

said interconnecting means includes an elongated retaining link means for limiting movement of said second member means along said interconnecting means to determine the distance said second member means is suspended from said handle member means.

5. A convertible device effective as a leash and as a nunchaku, said device comprising:

first and second elongate members;

means for detachably connecting said first and second members together into a single unitary elongate member;

an elongate nonresilient flexible member having two distal ends, one of said distal ends being attached to said first elongate member, the other of said distal ends being attached to said second elongate member;

means at said other distal end of said flexible member for detachably connecting said device to an animal and for attaching said other distal end to said second elongate member;

said device being constructed so that if said first and second elongate members are connected by said means for detachably connecting into said unitary elongate member, said device is effective as a dog leash; and if said first and second members are disconnected one from the other, so that said flexible member remains attached at said two distal ends to said first and second elongate members, said device is effective as a nunchaku.

* * * * *